(12) United States Patent
Acharya et al.

(10) Patent No.: US 7,027,649 B1
(45) Date of Patent: Apr. 11, 2006

(54) COMPUTING THE EULER NUMBER OF A BINARY IMAGE

(75) Inventors: Tinku Acharya, Chandler, AZ (US);
Bhargab B. Bhattacharya, Calcutta (IN); Arijit Bishnu, Calcutta (IN);
Malay K. Kundu, Calcutta (IN);
Chivukula A. Murthy, Calcutta (IN)

(73) Assignees: Intel Corporation, Santa Clara, CA (US); Indian Statistical Institute, Calcutta, IN (US)

( * ) Notice: Subject to any disclaimer, the term of this patent is extended or adjusted under 35 U.S.C. 154(b) by 1038 days.

(21) Appl. No.: 09/722,982

(22) Filed: Nov. 27, 2000

(51) Int. Cl.
*G06K 9/46* (2006.01)

(52) U.S. Cl. ...................... 382/204; 382/305

(58) Field of Classification Search ............. 382/190, 382/192, 194, 203, 204, 205, 245, 305, 307, 382/308
See application file for complete search history.

(56) References Cited

U.S. PATENT DOCUMENTS

| | | | | |
|---|---|---|---|---|
| 3,905,018 A | * | 9/1975 | Gray | 382/308 |
| 5,553,196 A | * | 9/1996 | Takatori et al. | 706/31 |
| 6,335,986 B1 | * | 1/2002 | Naoi et al. | 382/190 |

OTHER PUBLICATIONS

Di Zenzo et al, "Run-Based Algorithm for Binary Image Analysis and Processing", Jan. 1996, IEEE Transaction on Pattern Recognition and Machine Intellegence, ISBN: 0162-8828, vol. 18, No. 1, pp. 83-89).*
Chiavetta et al, "Digital Connectedness via Connectivity Graph", 1992, IEEE Paper ISBN: 0-8186-2920, pp. 646-649.*
C.R. Dyer, "Computing the Euler Number of an Image from its Quadtree", Computer Graphics Image Processing, vol. 13, No. 3, pp. 270-276, Jul. 1980.
R.E. Gonzalez et al., "Digital Image Processing", Addison-Wesley, Reading, Massachusetts, pp. 504-506, 1993.
S.B. Gray, "Local Properties of Binary Images in Two Dimensions", IEEE Trans. Computers, No. 5, pp. 551-561, May 1971.
W.K. Pratt, "Digital Image Processing", John Wiley & Sons, 1978, pp. 526-531.
H. Samet et al., "Computing Geometric Properties of Images Represented by Linear Quadtrees", IEEE Trans. PAMI, vol. PAMI-7, No. 2, Mar. 1985, pp. 229-240.

* cited by examiner

*Primary Examiner*—Samir Ahmed
(74) *Attorney, Agent, or Firm*—Trop, Pruner & Hu, P.C.

(57) ABSTRACT

An Euler number representation of a binary image is calculated. The binary image is considered as a series of partial images. The Euler number for each partial image is calculated using properties of runs of zeros and ones in the pixel matrix, and the results are combined together. The operations may be performed sequentially or in parallel. The calculations may be performed using discrete logic components for on-chip VLSI implementations.

16 Claims, 9 Drawing Sheets

COMPUTING THE EULER NUMBER OF A BINARY IMAGE

BACKGROUND

This invention relates to image processing and, more particularly, to computing an Euler number for an image.

Image processing refers to the analysis and manipulation of images using a computer. The discipline encompasses a wide array of techniques, including pattern recognition and other image analysis, compression and encoding, such as for image transmission, and image construction, to name but a few examples. Image processing is used in diverse fields such as astronomy, medicine, military operations, communications, geology, meteorology and so on.

A binary or digital image is typically represented by one or more topological properties. Topological properties represent the geometric shape of the image. Where changes are made to the image itself, such as stretching, deformation, rotation, scaling, translation, or other rubber-sheet transformations, the topological properties do not change. These properties, therefore, are quite useful in image characterization. Topological properties, for example, may be helpful in performing shape matching, object and pattern recognition, image data retrieval, and so on.

One topological property of a digital image is known as an Euler number. An Euler number is defined as the difference between the number of connected components of the binary image and the number of holes in the image. Like the other topological properties, the Euler number remains invariant despite the above-mentioned transformation of the binary image.

For some classes of digital images, Euler numbers have strong discriminatory power. In other words, once the Euler number for a particular digital image is known, the digital image may readily be distinguished from other digital images in its class. This implies that the Euler number may be used for more efficient searching or matching of digital images.

For example, the Euler number may be used in medical diagnosis such as the detection of malaria infected cells. By calculating the Euler number of each cell image, the malaria infected cells may be identified, as the Euler number of an infected cell is often different from that of an uninfected cell. The Euler number may also be used for image searching, such as in a database of logo images. Critical image processing applications such as these involve large amounts of data and, at the same time, expect quick real-time response. Fast computation of the Euler number of an image, for some applications, is, therefore, an indispensable task.

Obtaining the Euler number for a digital image, however, may be computationally expensive. For a pixel matrix including 150,000 pixels, for example, over 300,000 pixel accesses and 50,000 or more processor cycles may be expected in computing the Euler number.

Thus, there is a continuing need for better ways to compute the Euler number for a binary image.

DETAILED DESCRIPTION

In accordance with the embodiments described herein, an Euler number representation of a binary image is calculated. The calculations may be performed using discrete logic components to analyze the binary image.

Figure 1:
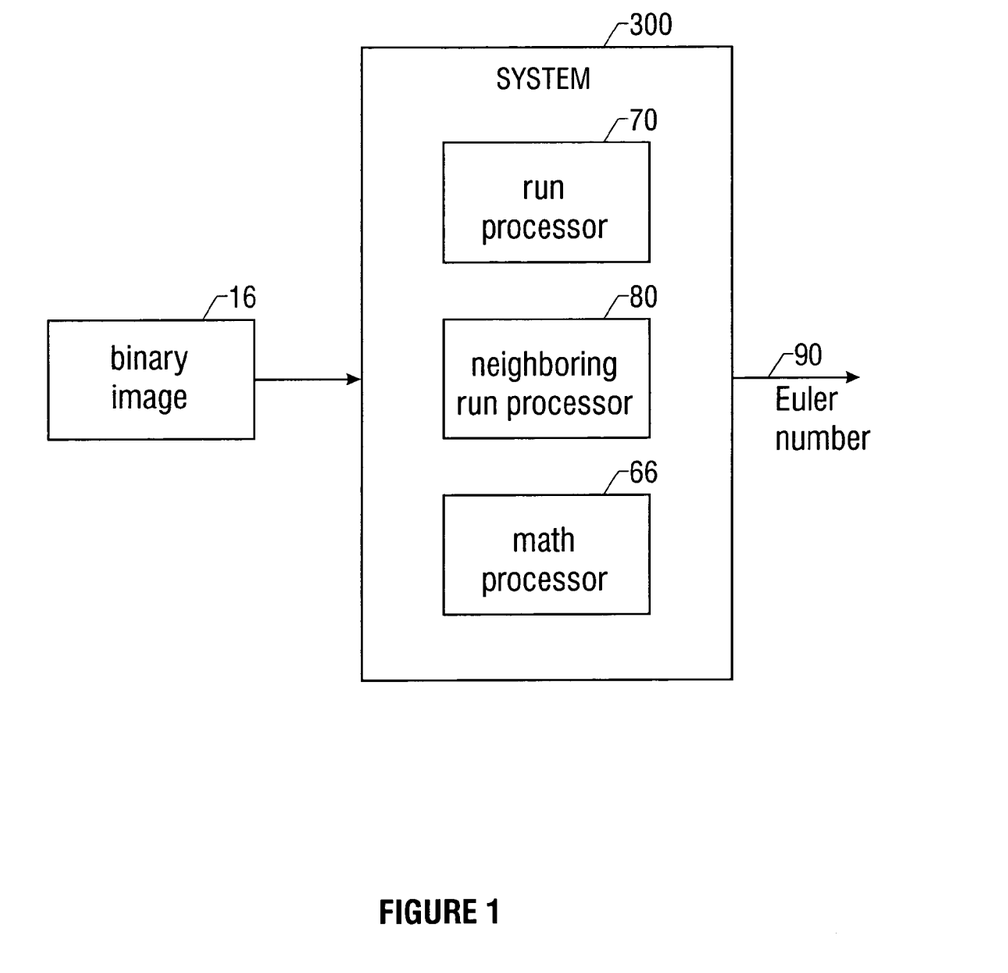
FIG. 1 is a block diagram of a system for computing the Euler number of a binary image according to one embodiment.

In FIG. 1, a system 300 includes logic for computing an Euler number to represent a binary image, according to principles described below. In the following, a binary image 16 is analyzed by the system 300 and, based upon the analysis, an Euler number 90 is computed.

The system 300 includes circuitry for calculating the Euler number 90 of the binary image. According to the embodiments described below, a portion of the binary image 16 is analyzed such that Euler number 90 for the portion, or partial binary image, may be computed. Additional portions of the binary image 16 are likewise analyzed, in an iterative manner, until an Euler number 90 of the entire binary image 16 may be obtained.

The Euler number 90 may be very useful in characterizing a binary, or two-tone, image. Such characterization, for example, may be useful in performing database retrieval of binary images. Further, the principles embodied herein may be applied to gray-tone or color images which are divided into two-tone portions. Before describing the features of the system 300 further, an explanation of Euler numbers, as well as some properties of Euler numbers, follows.

Figure 2:
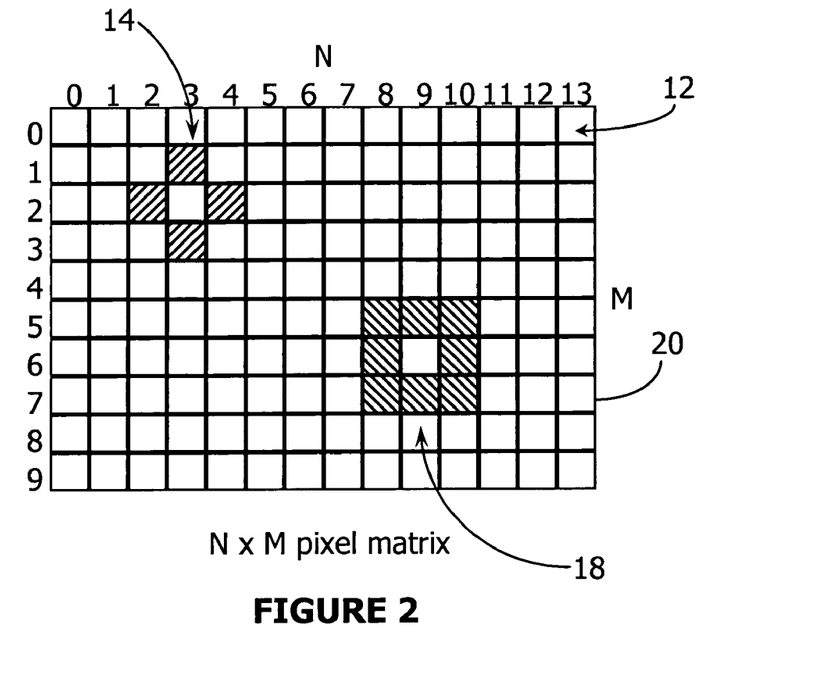
FIG. 2 is a diagram of an N×M pixel matrix according to one embodiment.

In FIG. 2, according to one embodiment, a pixel matrix 20 of size N×M, in which N=14 and M=10, is shown. The pixel matrix 20 includes N×M pixels 12 in which each pixel 12 may have a value of either a "1," for object pixels, or a "0," for background pixels.

In arriving at the Euler number 90, an analysis of the binary image 16 within the pixel matrix 20 is made. The Euler number is the difference between the number of connected components, or objects, and the number of holes in the binary image 16. A simple, geometric binary image 16 is depicted in FIG. 3.

To determine the number of connected components and holes in the binary image 16, a pixel 12 is analyzed in terms of adjacent pixels, or its neighbors, of variable granularity. For a pixel 12 at location (x,y) in the pixel matrix 20, a 4-neighborhood 14 includes the set of pixels at locations [(x−1,y), (x+1,y), (x,y−1), and (x,y+1)]. For example, in FIG. 2, a 4-neighborhood 14 of pixel locations [(2,2), (4,2), (3,1), and (3,3)] surrounds the pixel 12 at location (3,2).

Similarly, an 8-neighborhood 18 of pixel locations [(8,5), (8,6), (8,7), (9,5), (9,7), (10,5), (10,6), (10,7)] is shown in FIG. 2, for the pixel 12 at location (9,6). As expected, the 8-neighborhood 18 includes eight pixels 12 surrounding the pixel 12 that is analyzed. The 8-neighborhood 18 of a pixel 12 at location (x,y) includes the set of pixels at locations [(x−1,y−1), (x−1,y), (x−1,y+1), (x,y−1), (x,y+1), (x+1,y−1), (x+1,y), and (x+1,y+1)]. Neighborhoods of different sizes may similarly be defined.

Figure 3:
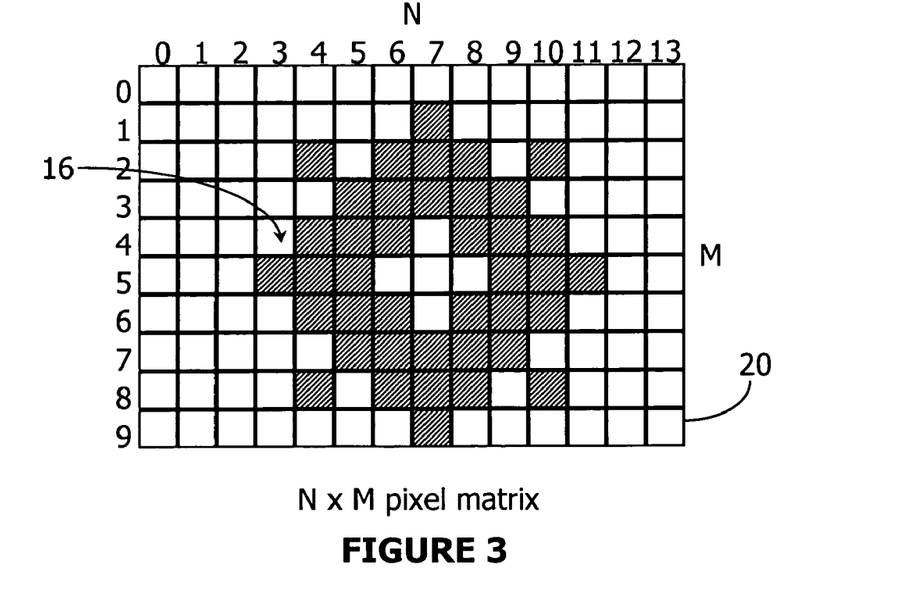
FIG. 3 is a diagram of a binary image in the N×M pixel matrix according to one embodiment.

In FIG. 3, the binary image 16, a diamond-like geometric pattern with a hole in its center, occupies the pixel matrix 20. In the binary image 16, a connected component is a set of object pixels, e.g., pixels with a value of "1," such that any object pixel in the set is in the neighborhood of at least one object pixel of the same set.

Assume that the shaded pixels represent a pixel value of "1." All of the shaded pixels shown in the binary image 16 of FIG. 3 are connected components for a 8-neighborhood 18. However, for a 4-neighborhood 14, the shaded pixels 12 at (4,2), (10,2), (4,8), and (10,8) would not be considered connected components to the set comprising the remaining shaded pixels 12. Thus, the size of the neighborhood may affect which pixels 12 are connected to other pixels 12.

Another feature of the binary image 16 used to calculate the Euler number is a hole. A hole is set of background pixels, e.g., pixels of value "0" such that any background pixel in the set is in the neighborhood of at least one background pixel of the same set. Further, the entire set of background pixels is enclosed by a connected component.

Thus, in FIG. 3, the five non-shaded pixels 12 at the center of the binary image 16, or pixels at positions (6,5), (7,4), (7,5), (7,6), and (8,5), together make up the lone hole of the binary image 16. Because a hole is enclosed by a connected component, pixels 12 at position (5,2) and (10,7) are not considered hole pixels. It may be noted that, for an 8-neighborhood object, a hole should have a 4-neighborhood relation, and vice-versa.

Still another feature used to calculate the Euler number, according to one embodiment, is a run. A run, R(i), of the $i^{th}$ column (or row) of the pixel matrix 20 is defined to be a maximal sequence of consecutive 1's in the $i^{th}$ column (or row).

If the binary image 16, known as I, consists of a single row or a single column i, the Euler number of the image 16 is the same as the number of runs, R(i), of the image 16, as shown by the following formula:

Property A: $E(I)=R(i)$

For example, for the 0th row of the pixel matrix 20 of FIG. 3, the run R(0) is zero, since there are no consecutive 1's in the row. For the first row, the number of runs, R(1), equals one. In the second row, the number of runs, R(2), is three, as there are three maximal sequences of 1s: a single '1,' at position (4,2), a sequence of three consecutive 1's, (from (6,2) through (8,2), and a single '1,' at position (10,2).

Thus, from Property A, the Euler number, E(I), of image I may be determined, where I includes a single row (or column). Additionally, the Euler number satisfies the additive set property. Given two images, $I_1$ and $I_2$, the union (∪) of the two images is defined as a simple juxtaposition of $I_1$ and $I_2$, either vertically or horizontally, without any overlap.

Figure 4A:
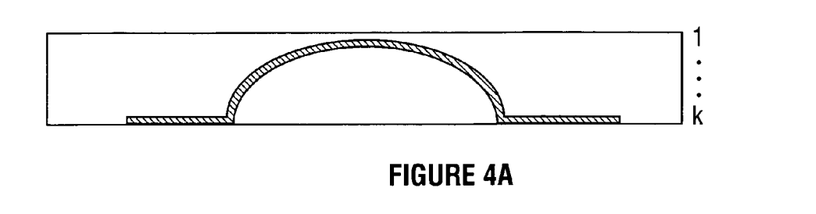
FIGS. 4A–4D are diagrams illustrating the union and intersection of binary images according to one embodiment.
Figure 4B:
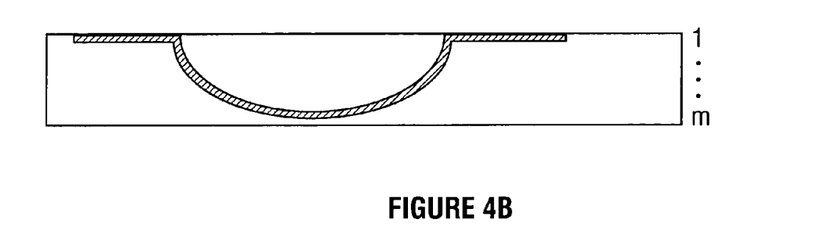
Figure 4C:
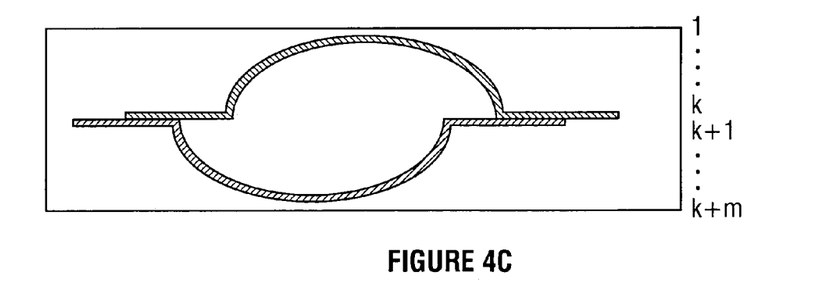

For example, an image, $I_1$, in FIG. 4A includes pixel rows 1 through k. Image $I_2$, in FIG. 4B, includes rows 1 through m. The union of these images, $I_1 \cup I_2$, is illustrated in FIG. 4C. Notice that the resulting image $I_1 \cup I_2$ includes k+m pixel rows.

Figure 4D:
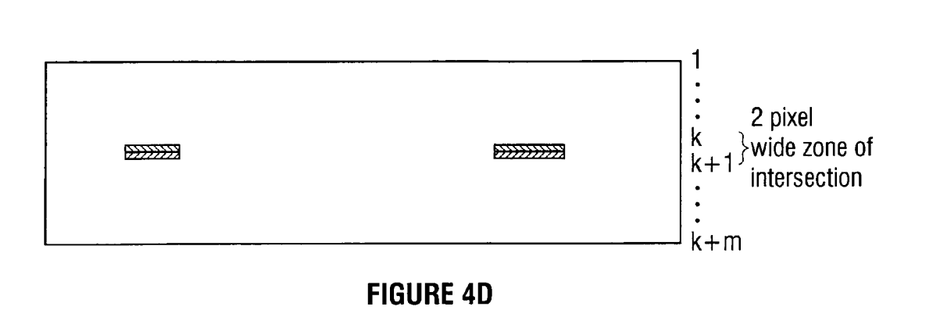

In contrast, the intersection (∩) of $I^1$ and $I_2$ is the image formed by the last row (or column) of $I_1$, and the first row (or column) of $I_2$, if the images $I_1$ and $I_2$ are joined horizontally (or vertically). The intersection image $I_1 \cap I_2$ is illustrated in FIG. 4D. Note that the intersection image is always two pixel rows (or columns) wide.

Suppose binary images $I_1$ and $I_2$ are joined horizontally, i.e., $I_1$ lies entirely above $I_2$, as shown in FIG. 4C. The last row of $I_1$ lies above the first row of $I_2$. Two runs appearing in two adjacent rows each are said to be neighboring if at least one pixel 12 of a run is in the neighborhood of a pixel 12 of the other run. Neighboring runs are defined according to the type of neighborhood, whether an 8-neighborhood, a 4-neighborhood, or a neighborhood of some other size.

From these observations, the Euler number for an image, I, which is the union of partial images, $I_1$ and $I_2$, with Euler numbers $E(I_1)$ and $E(I_2)$, respectively, may be obtained:

Property B: $E(I)=E(I_1 \cup I_2)=E(I_1)+E(I_2)-E(I_1 \cap I_2)$

As shown in FIG. 4D, the image $I_1 \cap I_2$ is an image containing the last row of $I_1$ and the first row of $I_2$. No holes can be present in the two-row-wide image. Where $O_i$ equals the number of neighboring runs between the $(i-1)^{th}$ and $i^{th}$ row, an additional observation may be made:

Property C: $E(I_{i-1} \cap I_i)=O_i$

So, where $I_{i-1}$ is the partial image consisting of rows 1, 2, . . . , (i−1) rows of the pixel matrix 20, $E(I_{i-1})$ is the Euler number of $I_{i-1}$. The Euler number of the image, I, consisting of only a single row, i, is R(i), from Property A. If the row, i, is added to $I_{i-1}$ to form the ∪ image, $I_i$, the intersection of these two images is formed by the $(i-1)^{th}$ and the $i^{th}$ rows.

From the above principles, an Euler number, E(I), for an image, I, may be computed incrementally from the partial images, $I_1, I_2, \ldots I_{N-1}, I_N$:

$$E(I_1) = R(1)$$

$$E(I_2) = E(I_1) + E(2) - O_2 = R(1) + R(2) - O_2$$

$$E(I_3) = E(I_2) + E(3) - O_3 = R(1) + R(2) + R(3) - (O_2 + O_3)$$

and, to generalize this, the formula:

$$E(I_N) = E(I) = E(I_{N-1}) + E(N) - O_N$$
$$= (R(1) + R(2) + R(3) + \ldots + R(N)) - (O_2 + O_3 + \ldots + O_N)$$
$$E(I_N) = \sum_{i=1}^{N} R(i) - \sum_{i=2}^{N} O_i$$

where $I_N$=I denotes the entire image.

Restating the formula, the Euler number of the binary image 16 is the difference between the sum of the number of runs for all rows (or columns) and the sum of the number of neighboring runs between all consecutive pairs of rows (or columns) of the pixel matrix 20.

Looking back to FIG. 1, according to one embodiment, the system 300 includes a run processor 70, for calculating the number of runs for the rows (or columns) of the binary image 16. The run processor 70 is described in more detail in FIG. 7, below.

The system 300 further includes a neighboring run processors 80, in one embodiment, for calculating the number of neighboring runs for consecutive rows (or columns) of the binary image 16. The neighboring run processor 80 is described in more detail in FIG. 8, below.

A math processor 66 computes the sum of the number of runs and the sum of the number of neighboring runs, according to one embodiment. The math processor 66 additionally may subtract the two sums, as specified above, in computing $E(I_N)$. The run processor 70, neighboring run processor 80, and math processor 66 may be implemented using discrete logic, specialized processing hardware such as digital signal processors (DSPs), or software, to name a few possible implementations of the system 300.

Using the formula for calculating the Euler number, E(IN), above, the Euler number of the binary image 16 may be iteratively computed. The Euler number of the first row (or column), comprising a first or partial image, is calculated. The next row (or column) is then added to the partial image and then the Euler number of the union image is calculated. Thereafter, successive rows (or columns) are added together and, accordingly, the Euler number of each partial image is calculated. The process is repeated until all rows (or columns) are exhausted.

Figure 5:
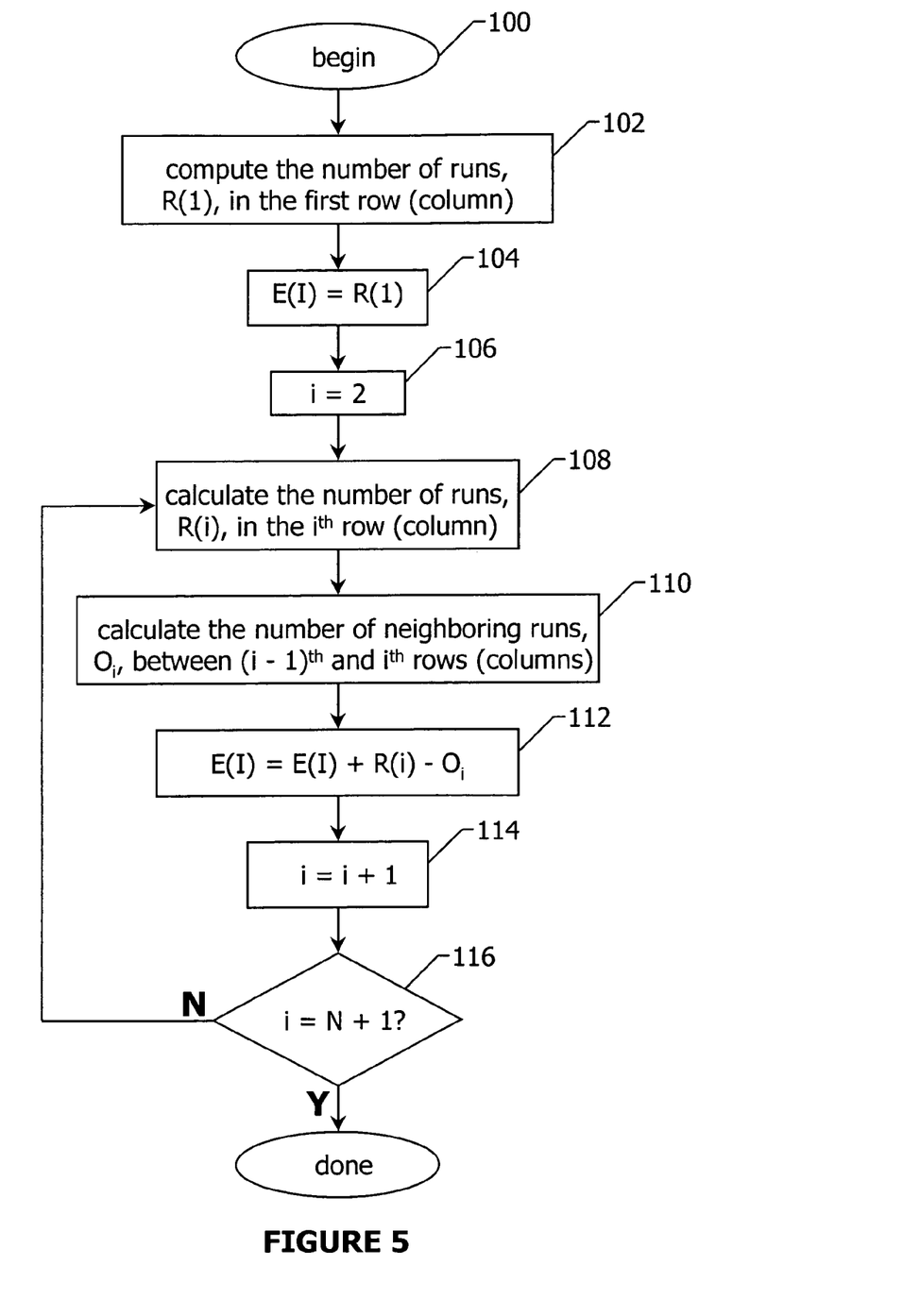
FIG. 5 is a flow diagram for sequentially calculating the Euler number of a binary image according to one embodiment.

In FIG. 5, a flow diagram illustrates the calculation of the Euler number for the binary image 16, according to one embodiment. The number of runs, R(1), in the first row (or column) of the binary image 60 of the pixel matrix 20 is computed (block 102). A first Euler number, E(I), for the partial image occupying only the first row (or column) is calculated, using property A (block 104). The variable, i, denoting the row (or column) of the pixel matrix 20, is set for subsequent analysis of the binary image 16 (block 106).

Succeeding operations are performed iteratively for all i rows (or columns) of the binary image 16. The number of runs, R(i), in the $i^{th}$ row (or column) is calculated (block 108). Likewise, the number of neighboring runs, $O_i$, between the $(i-1)^{th}$ and the $i^{th}$ rows (or columns) is calculated (block 110).

Once the number of runs, R(i) and the number of neighboring runs, $O_i$, is known, a new Euler number, E(I), of a partial image consisting of the first and subsequent rows (or columns) may be calculated, according to the formula derived above (block 112). This process is repeated iteratively until all the rows (or columns) of the pixel matrix 20 have been analyzed.

Figure 6:
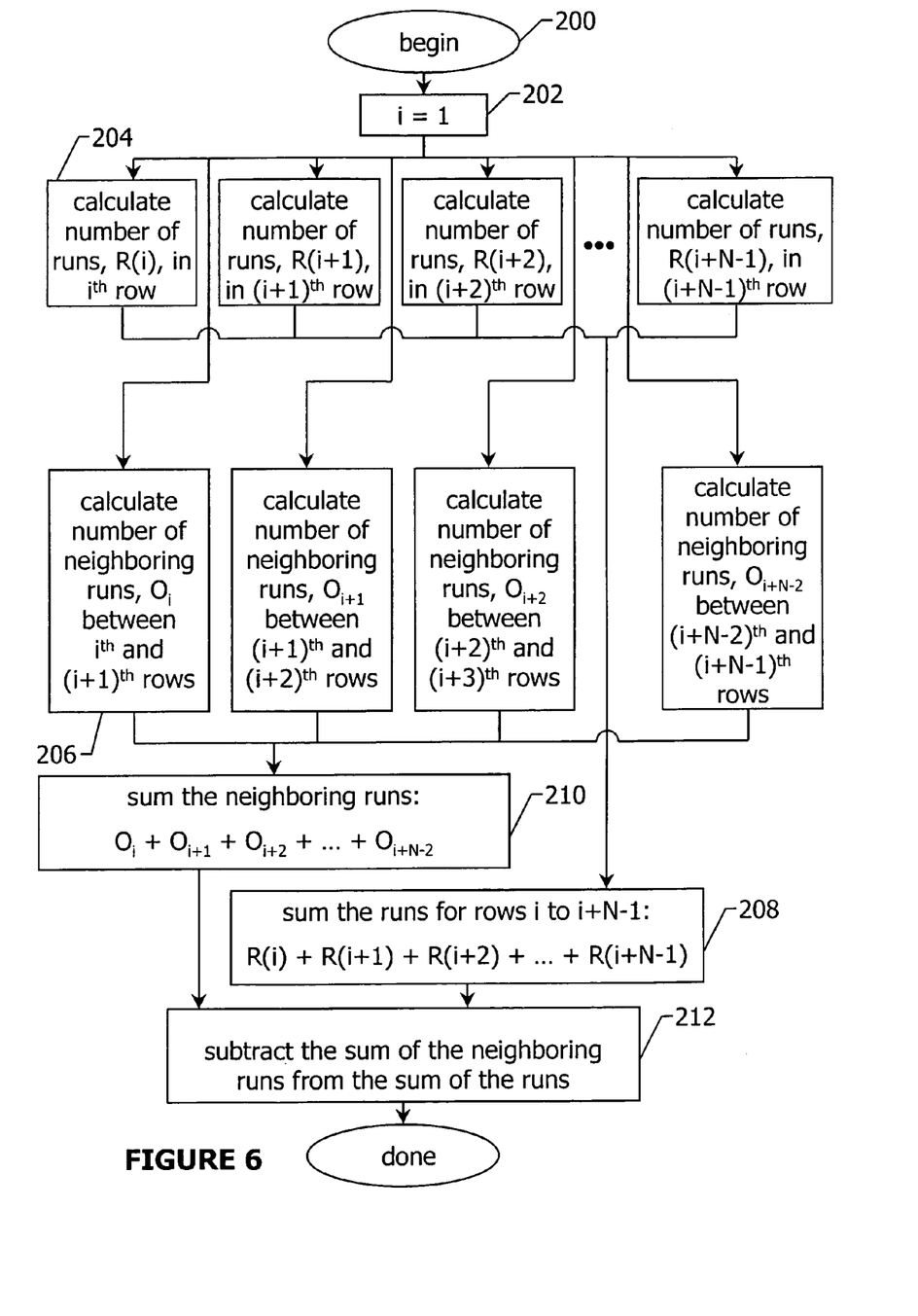
FIG. 6 is a flow diagram illustrating parallel calculation of the Euler number of a binary image according to one embodiment.

In a second embodiment, multiple run and neighboring run number calculations are performed in parallel, as shown in FIG. 6. Although the binary image 16 is subdivided into partial images according to rows, the binary image 16 may instead be divided into partial images comprising columns.

While the number of runs in the $1^{st}$ row is calculated, the numbers of runs in the $2^{nd}$ row may be calculated, the number of runs in the $3^{rd}$ row may be calculated, and so on up to the $N^{th}$ row, where N parallel processors are available (block 204).

Likewise, the number of neighboring runs between the $1^{st}$ and the $2^{nd}$ rows may be calculated, while, simultaneously with the operations of block 204, the number of neighboring runs between the $2^{nd}$ and $3^{rd}$ rows, between the $(N-1)^{th}$ and $N^{th}$ rows, and so on are calculated, where (N-1) neighboring run processors are available (block 206). Where N-1 processors are not available, a smaller number of parallel operations may be performed. The variable, i (shown in block 202), could be incremented based upon the number of parallel operations being performed. The operations of blocks 204 and 206 may be repeated, as needed, until both the number of runs and the number of neighboring runs for all rows have been calculated.

In one embodiment, the runs for all the rows are added together (block 208). Likewise, the number of neighboring runs for all pair of consecutive rows are added together (block 210). The Euler number 90 for the complete binary image 16 is calculated by subtracting the sum of the neighboring runs from the sum of the neighboring runs (block 212).

In one embodiment, a very large scale integration (VLSI) architecture is implemented to compute the Euler number 90 for the binary image 16. A special purpose VLSI chip may serve as a coprocessor to a host computer, for example, to expedite computation of the Euler number 90. See, for example, FIG. 10, below.

In one embodiment, the VLSI architecture includes the two processing elements shown in FIG. 1. The run processor 70 computes the number of runs in a row (or column). The neighboring run processor 80 computes the number of neighboring runs between two consecutive rows (or columns).

Figure 7:
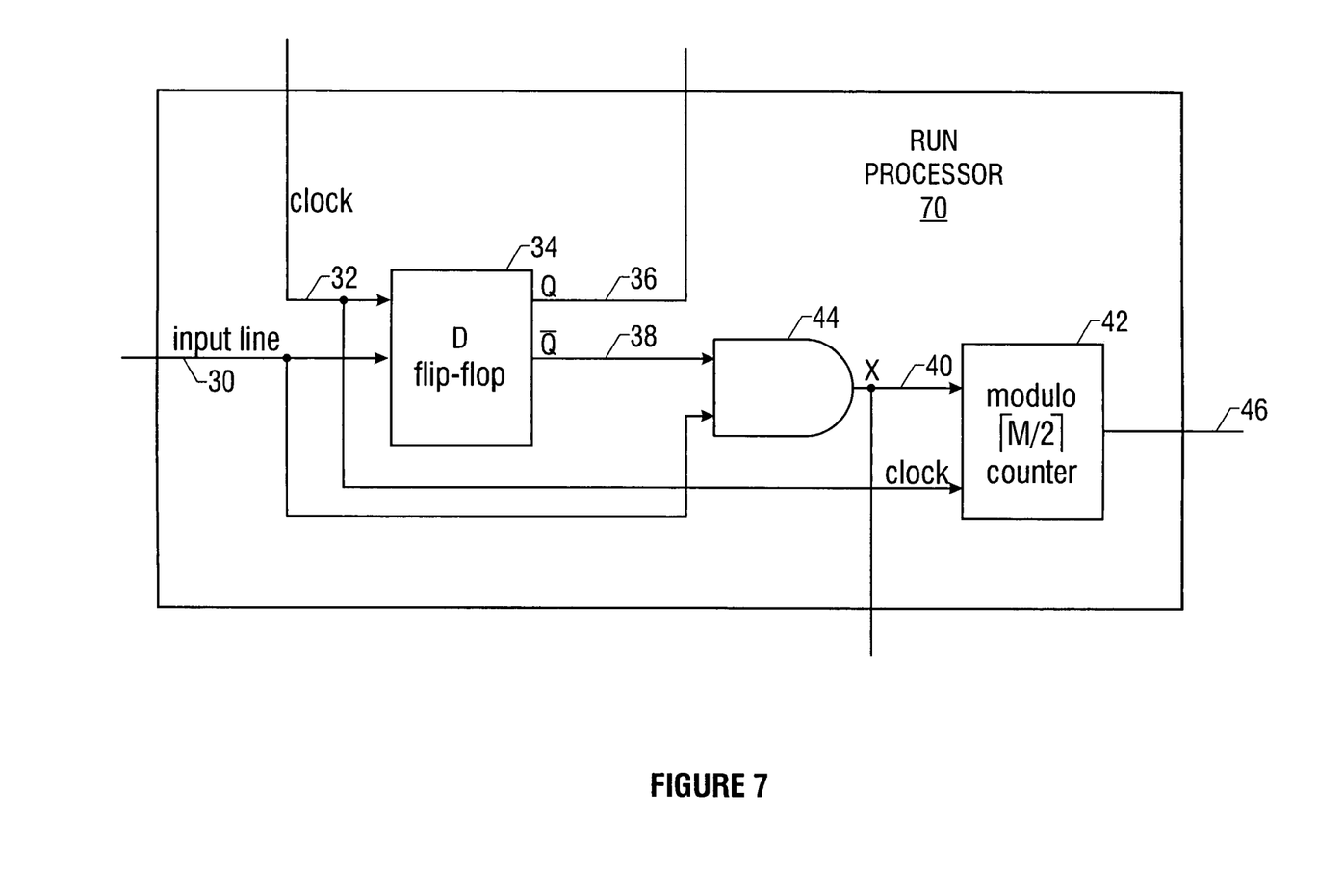
FIG. 7 is a logic diagram of a run processor used to compute the Euler number according to one embodiment.

In FIG. 7, a run processor 70, according to one embodiment, includes discrete elements for identifying runs within the binary image 16. The discrete elements include a D flip-flop 34, an AND gate 44, and a modulo counter 42.

In one embodiment, the run processor 70 calculates the number of transitions from '0' to '1' in the N×M pixel matrix 20. The number of runs is equal to the number of such transitions. An input line 30 is fed into the D flip-flop 34, for receiving each pixel in a row (or column) of the pixel matrix 20.

The D flip-flop 34 is set to 0 at the beginning of processing each row (or column). The D flip-flop 34 holds the value of the previous pixel to check for a transition. The pixels in a row (or column) are pipelined into the run processor 70, at the input line 30. At any instant of time, $t_i$, the $i^{th}$ and $(i-1)^{th}$ pixel of a particular row (or column) are checked for a 0-to-1 transition.

In this manner, the run processor 70 identifies runs for each row (or column) of the pixel matrix 20. The D flip-flop 34 further receives a clock 32 to synchronize with each input pixel. When the clock 32 is high, a Q output 36 follows the input line 30. When the clock 32 is low, there is no change to the output. The $\overline{Q}$ output 38 AND-ed with the input line 30 produces an output 40, shown as X, which, if high, identifies the start of a run for the row (or column) being analyzed. As shown below, the Q output 36 from the D flip-flop 34, and the output X from the AND gate 44, may be fed into a neighboring run processor 80. The X output 40 is fed into the modulo counter 42, which keeps a count of the number of times X goes high, i.e., the number of runs. The X output 40 may also be received by the neighboring run processor 80, as shown below.

For a binary image 16 in an N×M pixel matrix 20, if the pixels are processed column-by-column (or row-by-row), the maximum number of runs possible in a row (or column) is $\lceil M/2 \rceil$ (or $\lceil N/2 \rceil$). If the processing is done column-by-column, the counter is a modulo $\lceil M/2 \rceil$ counter 42. The modulo $\lceil M/2 \rceil$ counter 42 also receives the clock 32, and, each time a run for the column is identified, the counter 42 is incremented. An output signal 46 indicates the number of runs counted.

Figure 9:
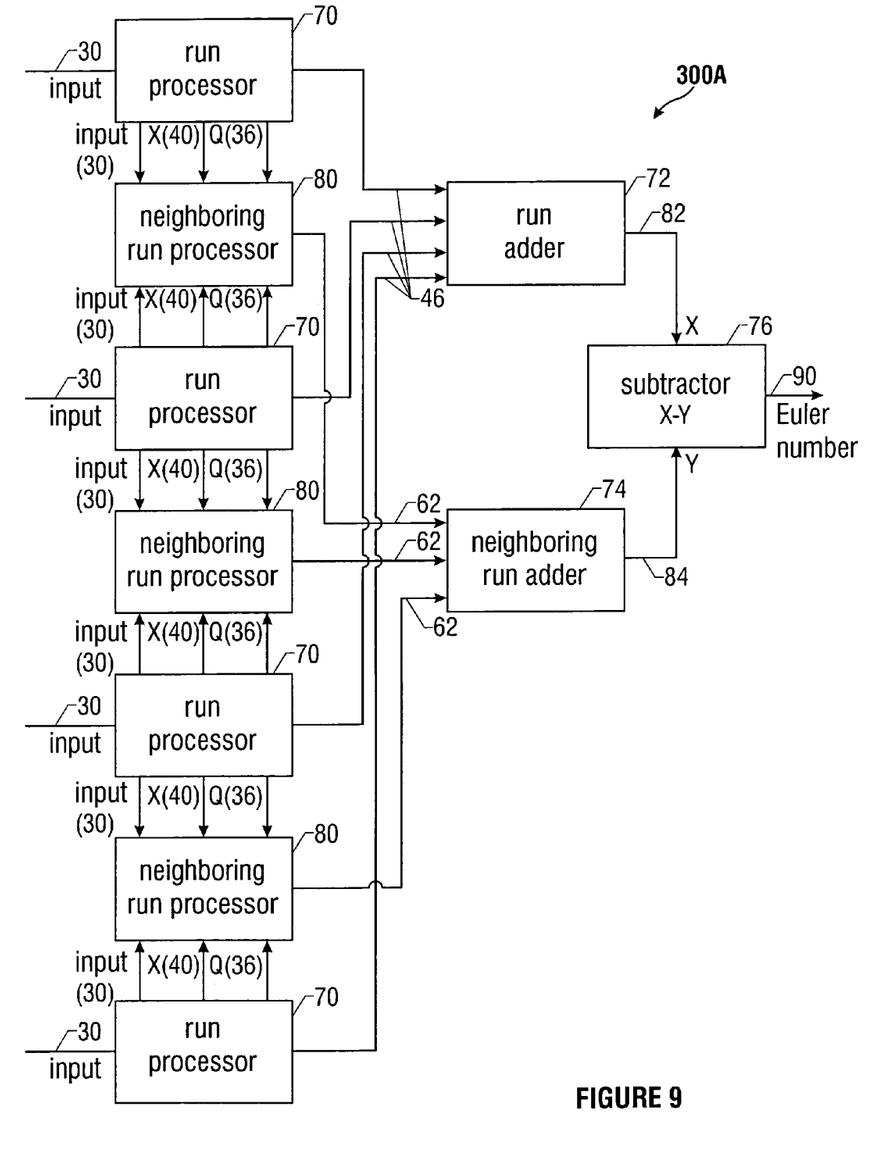
FIG. 9 is a sample circuit for performing parallel calculation of the Euler number for a 4×5 image according to one embodiment.

Thus, in one embodiment, after all pixels have been processed and all runs have been counted, the output signals 46 are fed to a run adder 72, as shown in FIG. 9, for computing a sum of all such occurrences of runs.

Figure 8:
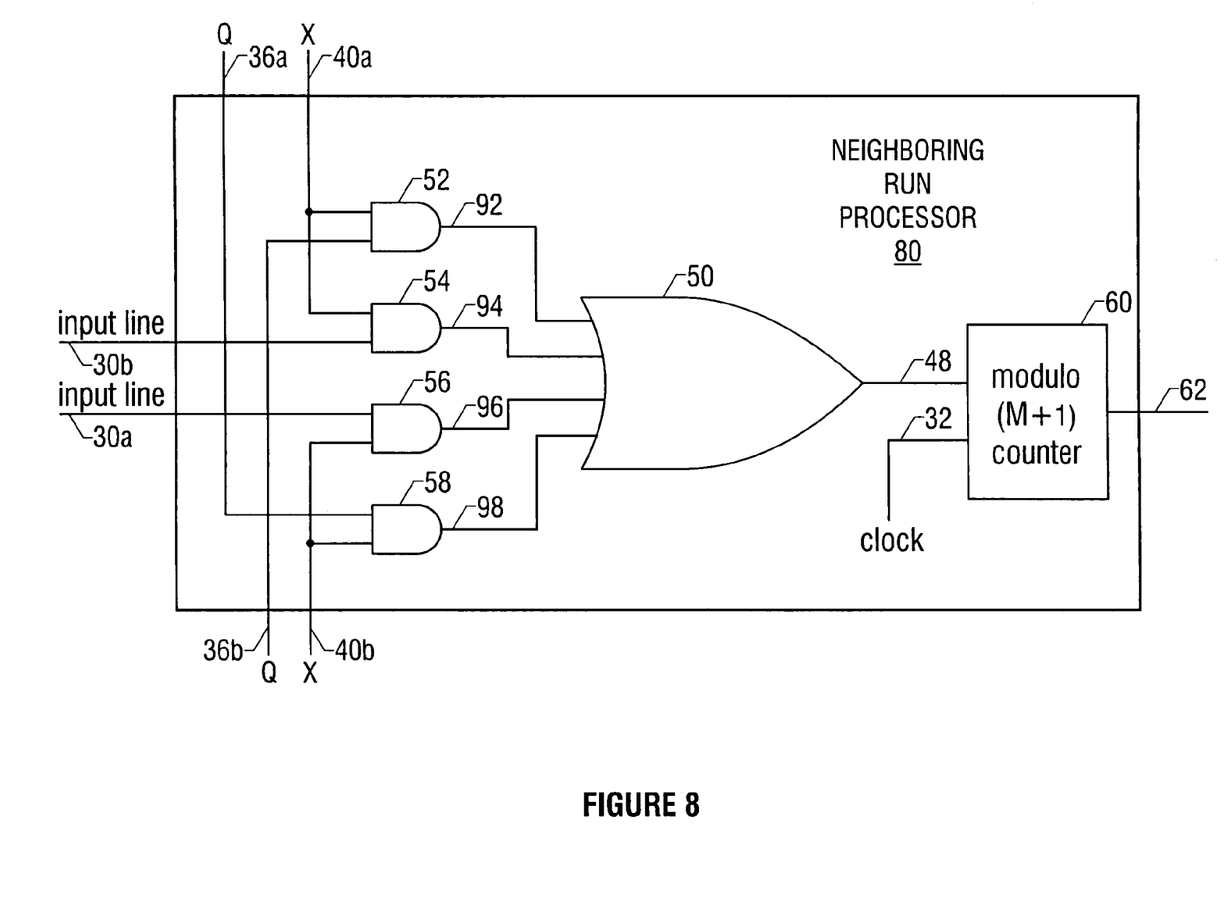
FIG. 8 is a logic diagram of a neighboring run processor used to calculate the Euler number according to one embodiment.

The neighboring run processor 80 identifies the neighboring runs between consecutive rows (or columns) of the binary image 16. The neighboring run processor 80 checks for the condition when a particular run in a row (or column) starts and also determines whether the run is in the neighborhood of another run in its adjacent row (or column). In one embodiment, the pixels 12 of two adjacent rows (or columns) are fed to the neighboring run processor 80 in pipeline.

Additionally, the neighboring run processor 80 receives data from the output of the D flip-flops 34 (Q outputs 36a and 36b) and AND gate 44 (X outputs 40a and 40b) of two consecutive rows (or columns). Accordingly, the neighboring run processor 80 is flanked on either side by a run processor 70, in one embodiment. At any instant of time, $t_j$ the $i^{th}$ and $(i-1)^{th}$ pixels 12 of consecutive rows (or columns) are checked for a neighboring run.

As with the run processor 70, the neighboring run processor 80, in one embodiment, uses discrete logic to perform counting operations. AND gates 52, 54, 56, and 58 receive the X signals 40a and 40b, the Q signals 36a and 36b, and the input signals 30a and 30b, as depicted in FIG. 8. Output signals 92–98, received from the AND gates 52–58, respectively, go high when neighboring runs are identified. The output signals 92–98 are fed into a four-input OR gate 50, to produce output signal 48. Each time the output signal 48 goes high, a neighboring run has been identified in the pixel matrix 20.

The neighboring run processor 80 also includes a modulo counter 60, for counting the occurrences where the output signal 48 goes high. The modulo counter 60 receives the clock signal 32.

For an N×M pixel matrix 20, the maximum number of neighboring runs is 2×⌈M/2⌉, or M+1. Accordingly, in one embodiment, the modulo counter 60 is a modulo (M+1) counter. The counter produces output signals 62, which comprise a sum of the neighboring runs in a pair of consecutive rows (or columns).

To process an N×M image in parallel, according to one embodiment, N copies of the run processor 70 and N−1 copies of the neighboring run processor 80 are used. For example, in FIG. 9, a circuit for calculating the Euler number for a 4×5 image includes four run processors 70 and three neighboring run processors 80.

Each neighboring run processor 80 receives three sets of inputs, according to one embodiment. Two input signals 30 correspond to each pixel in adjacent rows (or column) of the pixel matrix 20. Two X outputs 40 and two Q outputs 36 correspond to the neighboring relation of a run for the adjacent rows (or columns).

In one embodiment, the outputs 46 from the run processors 70 are fed into a run adder 72. Likewise, the outputs 62 from the neighboring run processors 80 are fed into a neighboring run adder 74. The run adder 72 is an N-input adder and the neighboring run adder 72 is a (N−1)-input adder. In one embodiment, the adders 72 and 74 may perform additions up to ⌈N×⌈M/2⌉⌉ and ⌈2×(N−2)×⌈M/2⌉⌉, respectively.

The run adder 72 produces output signal 82, shown as X, while the neighboring runs adder 74 produces output signal 84, shown as Y. The circuit of FIG. 9 further includes a subtractor 76, for subtracting the sum of the neighboring runs (or Y 84) from the sum of the runs (or X 82). In one embodiment, the subtractor 76 handles values in the range [{−2×(N−1)×⌈M/2⌉}, {N×⌈M/2⌉}]. A result 90 is the Euler number of the 4×5 image received.

Figure 10:
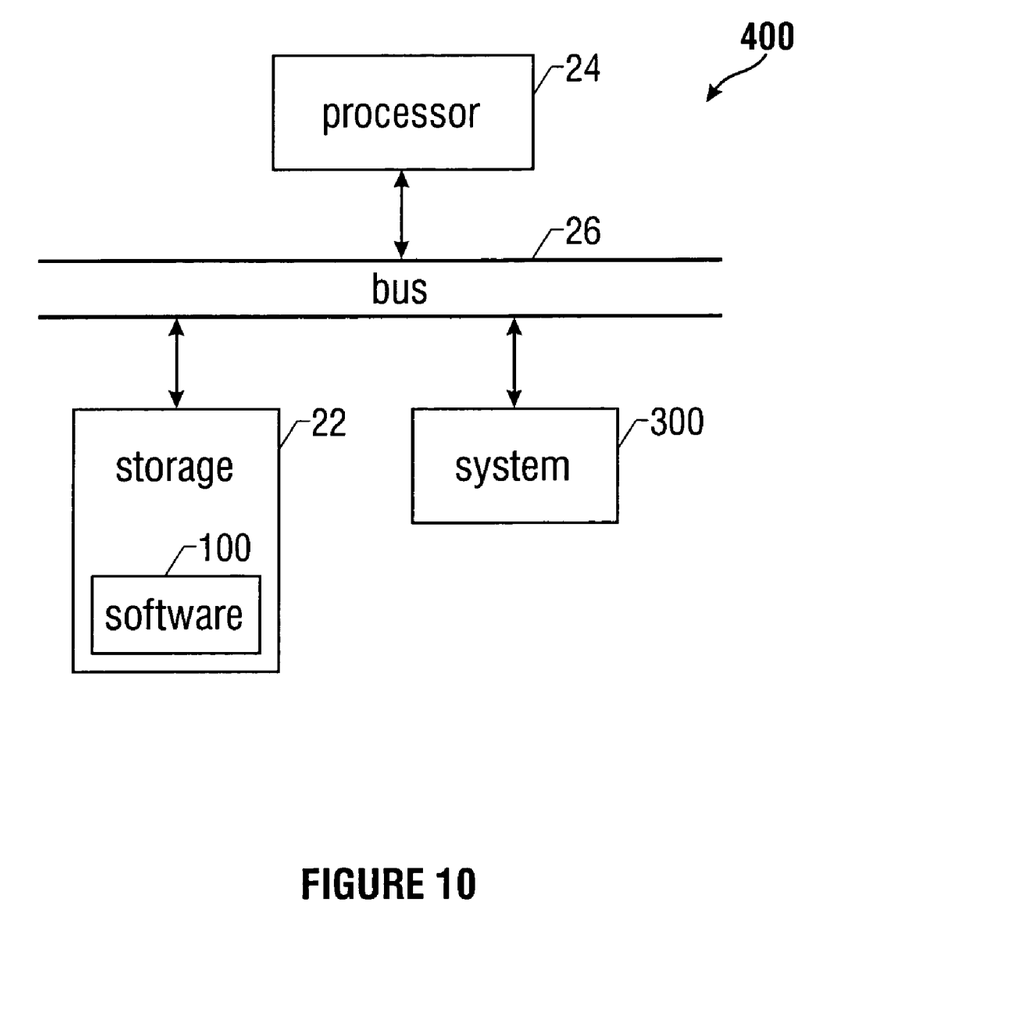
FIG. 10 is a block diagram of a processor-based system including Euler number calculation capability according to one embodiment.

The system 300 of FIG. 1 may be implemented in a processor-based system 400, as in FIG. 10. A processor 24 is connected to the system 300 by a bus 26. The system 300 may serve as a coprocessor to the processor 24, to compute the Euler number 90.

The processor-based system 400 further includes a storage 22, such as a memory or other volatile medium. As examples, the storage 22 may be a random access memory (RAM) or a flash/read-only memory (ROM), although this represents but two of many possible types of storage. Additionally, the storage 22 may store a software program 100, such as for implementing the operations of FIG. 5.

In one embodiment, the storage 22 may be N×M bits to store all the pixels 12 of the binary image 16 in a N×M pixel matrix 20 (since each pixel 12 in a binary image is either 0 or 1). To calculate the number of neighboring runs between two consecutive rows (or columns), the column (or row) number identifying the starting point and the continuity of a particular run may be ascertained from output values Q 36 and X 40 (FIG. 7).

A worst case scenario for calculating the Euler number 90 arises when every alternating pixel 12 is an object pixel. There, the maximum number of runs in a row (column) is ⌈M/2⌉. Where the rows (columns) are analyzed sequentially, such as depicted in FIG. 5, the number of neighborhood runs is calculated between two consecutive rows (columns) at a time. In one embodiment, the space for storing a run is 2 locations. Under worst case conditions, therefore, the space for storage is 2×2×⌈M/2⌉. Thus, according to one embodiment, the total storage space used is N×M+4×⌈M/2⌉.

The time complexity of calculating the Euler number 90 according to the embodiments described herein may be measured in terms of the number of accesses of the pixels 12 of the pixel matrix 20. In one embodiment, the number of pixel accesses for computing the Euler number 90 for a binary image 16 is:

$$(N \times M) + 2 \times \left( \sum_{i=1}^{N} R(i) + \sum_{i=2}^{N} O_i \right)$$

The number of pixel accesses depends on the run distribution of the binary image 16 and, for a substantial number of binary images, R(i)<<M and $O_i$<<M.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   identifying a representation of a binary image in a pixel matrix, wherein the pixel matrix comprises a plurality of portions;
   computing the number of runs for a first portion of the pixel matrix, wherein a run is a maximal sequence of pixels having a predetermined value in the first portion;
   computing the number of neighboring runs between the first portion and a second portion of the pixel matrix, wherein a neighboring run is a run in which at least one pixel of the run is in the neighborhood of a run in an adjacent portion; and
   computing the Euler number from the number of runs and the number of neighboring runs.

2. The method of claim 1, computing the number of runs for a first portion of the pixel matrix further comprising:
   identifying one or more runs of the first portion;
   counting the number of runs.

3. The method of claim 2, computing the number of neighboring runs between the first portion and a second portion of the pixel matrix further comprising:
   determining a neighborhood size;
   identifying a second run in the second portion; and
   determining whether at least one pixel of the second run is in the neighborhood of the run.

4. The method of claim 3, computing the Euler number from the number of runs and the number of neighboring runs further comprising:
   subtracting the number of neighboring runs between the first portion and the second portion from a sum of the number of runs in the first portion and the second portion to arrive at a result; and
   adding the result to an Euler number for a third portion.

5. The method of claim 4, computing the Euler number from the number of runs and the number of neighboring runs further comprising:
   subtracting from the result the number of neighboring runs between the third portion and a prior third portion.

6. The method of claim 5, identifying the binary image in a pixel matrix further comprising identifying pixels of the predetermined value.

7. A system comprising:
   a run processor to compute a run number, wherein the run number is the number of runs in a portion of a pixel matrix; and
   a neighboring run processor to compute a neighboring run number, wherein the neighboring run number is the number of neighboring runs between the portion and a second portion of the pixel matrix and the neighboring run processor receives a plurality of signals from the run processor.

8. The system of claim 7, further comprising:
   a second run processor to compute a second run number;
   a second neighboring run processor to compute a second neighboring run number; and
   a math processor.

9. The system of claim 8, wherein the math processor further comprises:
   a run adder to add the run number to the second run number;
   a neighboring run adder to add the neighboring run number to the second neighboring run number; and
   a subtractor to subtract the run number from the neighboring run number.

10. The system of claim 7, wherein the portions comprise rows of the pixel matrix.

11. The system of claim 7, wherein the portions comprise columns of the pixel matrix.

12. An article comprising a medium storing software for enabling a processor-based system to:
   identify a binary image in a pixel matrix, wherein the pixel matrix comprises a plurality of portions;
   compute the number of runs for a first portion of the pixel matrix;
   compute the number of neighboring runs between the first portion and a second portion of the pixel matrix; and
   compute an Euler number from the number of runs and the number of neighboring runs.

13. The article of claim 12, further storing software for enabling a processor-based system to compute the number of runs for a first portion of the pixel matrix by:
   identifying one or more runs of the first portion, wherein a run is a maximal sequence of pixels with a predetermined value in the first portion;
   counting the number of runs.

14. The article of claim 13, further storing software for enabling a processor-based system to compute the number of neighboring runs between the first portion and a second portion of the pixel matrix by:
   determining a neighborhood size;
   identifying a second run in the second portion; and
   determining whether at least one pixel of the second run is in the neighborhood of the run.

15. The article of claim 14, further storing software for enabling a processor-based system to compute the Euler number from the number of runs and the number of neighboring runs by:
   subtracting the number of neighboring runs between the first portion and the second portion from a sum of the number of runs in the first portion and the second portion to arrive at a result; and
   adding the result to an Euler number for a third portion.

16. The article of claim 15, further storing software for enabling a processor-based system to compute the Euler number from the number of runs and the number of neighboring runs by:
   subtracting from the result the number of neighboring runs between the third portion and a prior third portion.

* * * * *